United States Patent [19]

Vennewald

[11] Patent Number: 4,658,711
[45] Date of Patent: Apr. 21, 1987

[54] CONTINUOUS CHURN

[75] Inventor: Werner Vennewald, Oelde, Fed. Rep. of Germany

[73] Assignee: Westfalia Separator AG, Oelde, Fed. Rep. of Germany

[21] Appl. No.: 750,575

[22] Filed: Jun. 28, 1985

[30] Foreign Application Priority Data

Jul. 17, 1984 [DE] Fed. Rep. of Germany ....... 3426280

[51] Int. Cl.$^4$ .............................................. A23C 17/00
[52] U.S. Cl. ...................................... 99/455; 99/459; 99/466
[58] Field of Search .......................... 99/452, 453–455, 99/456–459, 460, 461, 465, 495; 426/581–583, 34; 366/225–229

[56] References Cited

U.S. PATENT DOCUMENTS 2,351,458   6/1944   Senn ........................................ 99/456
3,233,327   2/1966   Martensson et al. ................... 99/459
3,292,259  12/1966   Lambert et al. ....................... 99/459
3,353,270  11/1967   Simon .................................... 99/459

FOREIGN PATENT DOCUMENTS 3039807  11/1982  Fed. Rep. of Germany .

Primary Examiner—Timothy F. Simone
Attorney, Agent, or Firm—Sprung Horn Kramer & Woods

[57] ABSTRACT

A continuous churn for making sweet-cream or sour-cream butter consists of an initial churning cylinder that contains a beater and creates butter grain and buttermilk, of a rotating second churning cylinder that is downstream of the initial cylinder and incorporates an afterchurning section, of a strainer-like section for separating the butter grain from the buttermilk, and of a washing section. To increase the yield of butterfat in the afterchurning section and decrease fluctuations in the butter's water content, a back-up disk is positioned between the afterchurning section and the separation section of the second churning cylinder.

10 Claims, 2 Drawing Figures

CONTINUOUS CHURN

BACKGROUND OF THE INVENTION

The present invention relates to a continuous churn for making sweet-cream or sour-cream butter and consisting of an initial churning cylinder that contains a beater and creates butter grain and buttermilk, a rotating second churning cylinder that is downstream of the initial cylinder and incorporates an afterchurning section, a strainer-like section for separating the butter grain from the buttermilk, and a washing section.

A churn of this type is known, for example, from German Pat. No. 3 039 807. The mixture of butter grain and buttermilk deriving from the initial churning cylinder flows in a thin sheet through the afterchurning section of the second churning cylinder and thence arrives in the separation and washing sections. The thickness of the sheet in the afterchurning section fluctuates because the mixture does not leave the initial churning cylinder uniformly. The thinness of the sheet results in a relatively short residence time in the afterchurning section, which leads in turn to low levels of butterfat recovery from the buttermilk. Furthermore, the irregular flow of product through the second churning cylinder makes the water content of the final product fluctuate, preventing optimal approximation to the permissible limits and causing an associated loss of butterfat.

SUMMARY OF THE INVENTION

The object of the present invention is to improve the known continuous churn, increasing the yield of butterfat in the afterchurning section and decreasing the fluctuations in the butter's water content.

This object is attained in accordance with the invention by a back-up disk positioned between the afterchurning section and the separation section of the second churning cylinder.

The back-up disk creates a pool of buttermilk and prolongs the residence time of the mixture of butter grain and buttermilk in the afterchurning section. It has been demonstrated that the prolonged residence time allows more non-fatty substances (NFS) from the buttermilk to accumulate on the already formed butter grain than in the known designs, resulting in a considerably higher yield of butterfat and hence greater effectiveness. Since the buttermilk pool created by the back-up disk also increases the yield of butterfat (the "churn effect") and compensates access fluctuations, fluctuations in the butter's final water content will also be reduced, which also makes the butter making more effective.

An especially satisfactory butterfat yield is attained when another back-up disk is positioned in the afterchurning section. This makes it possible to subject the pools of buttermilk in the afterchurning section to means for chilling at different temperatures and hence to control the churning-off process optimally.

The inside diameter of the second back-up disk should be shorter than that of the first back-up disk.

It is especially practical for the inside diameter of the first back-up disk to be 25% longer than that of the second back-up disk, The second back-up disk will be especially efficient when the ratio of its outside to its inside diameter is between 1.2 and 1.6. Optimal results will be attained, however, when the ratio is 1.4.

It is practical for the back-up disks to have recesses at their longest diameter to empty the afterchurning section through upon termination of production so that the section can be thoroughly cleaned.

The butterfat yield can be increased even more when another strainer jacket extending out from the inside diameter of the first back-up disk is positioned along with a first strainer jacket in the separation section and has larger perforations than the first strainer jacket. Thus, most of the butter grain will be separated out in the second strainer jacket, with the finer particles being intercepted by the first strainer jacket. This will relieve the first strainer jacket of the coarser particles and result in less pressure on it, extensively preventing the finer particles from being forced through the jacket and keeping them within the flow of butter.

The effectiveness of the buttermilk pool created by the back-up disk can also be augmented by chilling the mixture of butter grain and buttermilk.

Chilling will be especially effective when some of the buttermilk separated in the separation section is chilled and returned to the churn.

Optimal results are obtained when chilled buttermilk of different temperature is supplied to the buttermilk pools created by the two back-up disks.

To ensure uniform distribution it is practical to supply the buttermilk through pipes in the afterchurning section that are provided with a large number of radial perforations. The radial perforations should be oriented in such a way that the jets of buttermilk will not strike the product zone forming in the afterchurning section but, strike just upstream or just downstream of the zone or both.

This prevents breakdown of the butter grain.

A preferred embodiment of the invention will now be described with reference to the attached drawing, wherein:

DETAILED DESCRIPTION OF THE PREFERRED EMBODIMENTS

Figures 1, 2:
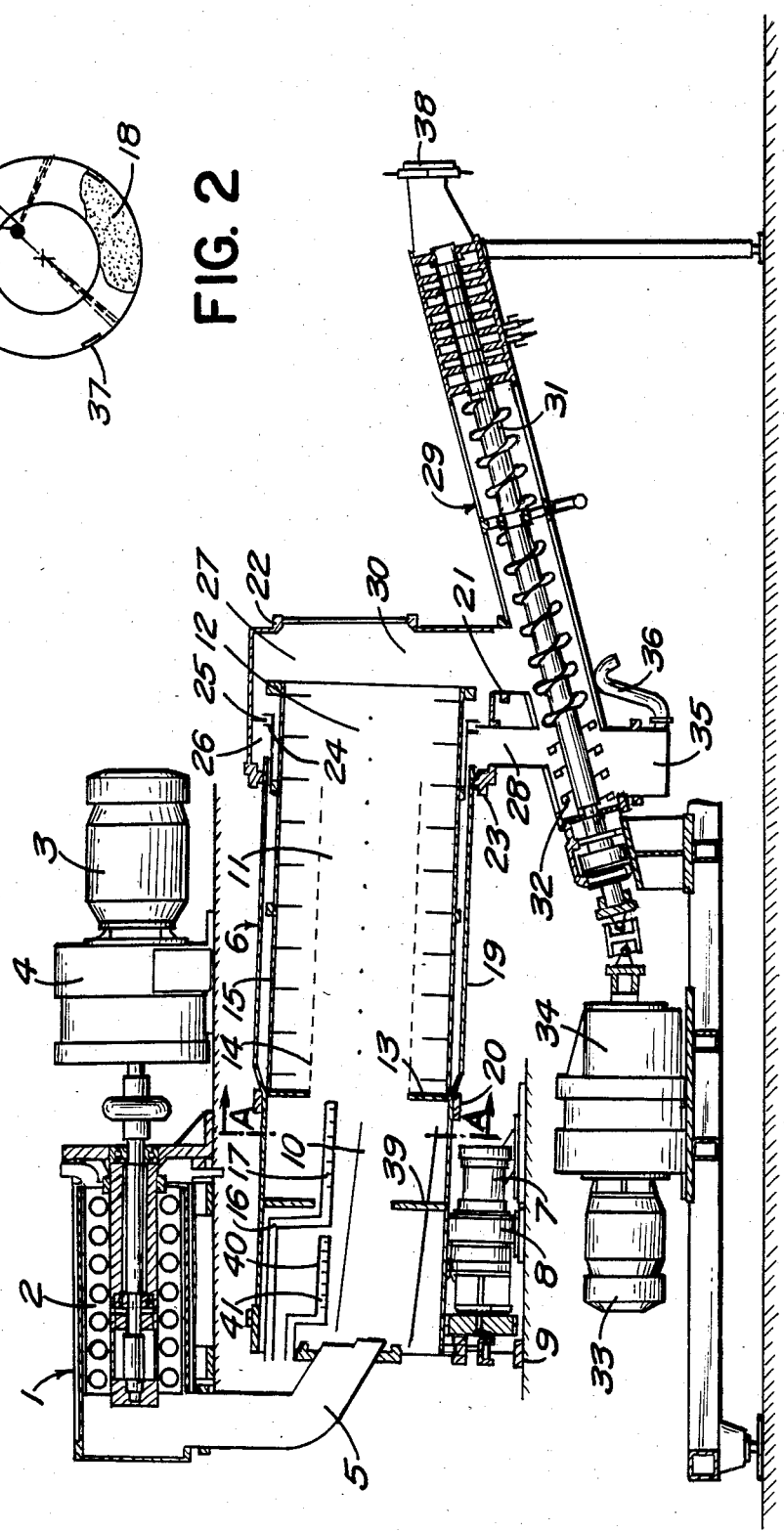
FIG. 1 is a section through the churn according to the invention.
FIG. 2 is a section along the line A—A in FIG. 1.

Referring to FIG. 1, a churning cylinder 1 accommodates a beater 2 that is powered by a motor 3, onto which a speed regulator 4 is flanged. An outlet 5 extends from churning cylinder 1 into another, rotating, churning cylinder 6 that is powered through a cogwheel drive 9 by another motor 7, which also has a speed regulator 8 flanged onto it. Second churning cylinder 6 consists of an afterchurning section 10, of separation section 11 with a fine-meshed first strainer jacket and of a washing section 12. Afterchurning section 10 and separation section 11 are separated by a back-up disk 13. There is another back-up disk 39 in afterchurning section 10. Another strainer jacket 14 is positioned concentric to first strainer jacket 15 in separation section 11 and extending out from the inside diameter of first back-up disk 13. Afterchurning section 10 contains pipes 16 and 40, which are provided with perforations 17 and 41 through which chilled buttermilk can be supplied. Perforations 17 and 41 are in two rows, which are positioned at an angle to ensure that the jets emerging from perforations 17 and 41 will strike just upstream and just downstream respectively of the product zone 18 that forms in afterchurning section 10 as shown in FIG. 2. Separation section 11 is surrounded by a cylindrical buttermilk-interception surface 19 and is rigidly fastened to rotating afterchurning section 10 at mount 20. Surface 19 is mounted at the other end to machine framework 21 and sealed off from a hood 22 with a seal 23 consisting of a labyrinth box or sleeve. Hood 22 is rigidly fastened to framework 21. There is a partition 24 at washing section 12 and another partition 25 at hood 22, dividing it into two chambers 26 and 27. A closed chute 28 extends from chamber 26 to the upstream end of a press-off 29. Another chute 30 extends from chamber 27 to and is rigidly fastened to a section that leads in turn to the out-take end of press-off 29. Press-off 29 accommodates conveyor worms 31, which have paddles 32 at the upstream end and are powered by a motor 33 with a flanged-on speed regulator 34. At the upstream end of press-off 29 is a buttermilk tank 35 with an outlet 36 extending from the vicinity of its floor. First back-up disk 13 has recesses 37 around it.

The function of the churn will now be described.

The cream that is to be churned is supplied to first churning cylinder 1, where beater 2 processes it into butter grain and buttermilk. The mixture of butter grain and buttermilk is supplied through outlet 5 to rotating second churning cylinder 6, where it is processed further into coarser particles of butter in afterchurning section 10, which is supplied with beating strips. Back-up disks 13 and 39 create two pools of buttermilk in afterchurning section 10, prolonging the residence time of the buttermilk in the section and increasing the yield of butterfat. The pools also compensate supply fluctuations and hence decrease fluctuations in the butter's final water content. The mixture of butter grain and buttermilk that arrives in separation section 11 over first back-up disk 13 flows over second strainer jacket 14 in a thin sheet, whereby the coarser particles of butter are precipitated, whereas the finer particles arrive along with the buttermilk against first strainer jacket 15, where they are separate from the buttermilk. Since first strainer jacket 15 is accordingly not loaded with coarser particles of butter, little butterfat will be forced through it. The separated butter grain arrives in press-off 29 through hopper 30 and is conveyed by conveyor worm 31 to downstream outtake 38.

The buttermilk arrives in buttermilk tank 35 over rotating interception surface 19 and through chute 28 and is removed through gooseneck outlet 36. Some of the buttermilk is chilled and fed back into the afterchurning section 10 of second churning cylinder 6 through an unillustrated line. The buttermilk is supplied in afterchurning section 10 through the perforations 17 and 41 in pipes 16 and 40, with the jets oriented not to strike product zone 18. This makes it possible to supply buttermilk to the pools in afterchurning section 10 at different temperatures.

It will be appreciated that the instant specification and claims are set forth by way of illustration and not limitation, and that various modifications and changes may be made without departing from the spirit and scope of the present invention.

What is claimed is:

1. In a continuous churn for making sweet-cream or sour-cream butter and having an initial churning cylinder containing a beater for creating butter grain and buttermilk, and a rotatable second churning cylinder that is downstream of the initial churning cylinder and includes an afterchurning section, a straining section for separating butter grain from buttermilk and a washing section, the improvement comprising a first back-up disk positioned between the afterchurning section and the straining section of the second churning cylinder.

2. The continuous churn as in claim 1, further comprising a second back-up disk positioned in the afterchurning section.

3. The continuous churn as in claim 2, wherein the inside diameter of the second back-up disk is shorter than that of the first back-up disk.

4. The continuous churn as in claim 3, wherein the inside diameter of the first back-up disk is 25% longer than that of the second back-up disk.

5. The continuous churn as in claim 2, wherein the ratio of the outside diameter of the second back-up disk to its inside diameter is between 1.2 and 1.6.

6. The continuous churn as in claim 5, wherein the ratio of the outside diameter to the inside diameter of the second back-up disk is 1.4.

7. The continuous churn as in claim 2, wherein the back-up disks have recesses at their longest diameter.

8. The continuous churn as in claim 1, wherein the straining section includes one strainer jacket extending from the outside diameter of the back-up disk and another strainer jacket extending out from the inside diameter of the first back-up disk and having larger perforations than the one strainer jacket.

9. The continuous churn as in claim 2, further comprising two pipes with perforations disposed in the afterchurning section and receptive of chilled buttermilk for directing same into pools created by the back-up disks.

10. The continuous churn as in claim 9, wherein the perforations are oriented such that the jets of buttermilk will strike just upstream and just downstream of a product zone that forms in the afterchurning section.

* * * * *